United States Patent [19]

Goris et al.

[11] Patent Number: 5,449,485
[45] Date of Patent: Sep. 12, 1995

[54] METHOD FOR FORMING AN OBJECT OF THERMOSETTING SYNTHETIC MATERIAL IN A MOULD

[75] Inventors: Joost Goris, Edegem; Guido Peeters, Antwerp, both of Belgium; Hendrik Den Uijl, Vianen, Netherlands

[73] Assignees: Atlas Copco Airpower, Wilrijk, Belgium; TPP Axxicon B.V., Vianen, Netherlands

[21] Appl. No.: 196,761

[22] Filed: Feb. 15, 1994

[30] Foreign Application Priority Data

Feb. 15, 1993 [BE] Belgium .............................. 09300140

[51] Int. Cl.⁶ ...................... B29C 45/14; B29C 45/17; B29C 45/73
[52] U.S. Cl. ............... 264/328.6; 264/328.15; 264/328.16; 425/571; 425/543; 425/549
[58] Field of Search ............... 264/328.1, 328.3, 328.6, 264/328.14, 328.15, 328.16, 243, 271.1, 273, 279; 425/566, 571, 543, 548, 549, 577

[56] References Cited

U.S. PATENT DOCUMENTS 2,410,510  11/1946  Lester .......................... 264/328.15
4,784,814  11/1988  Diethelm et al. .

FOREIGN PATENT DOCUMENTS 0248567  12/1987  European Pat. Off. .
0333456  9/1989  European Pat. Off. .
0492477  7/1992  European Pat. Off. .

Primary Examiner—Jill L. Heitbrink
Attorney, Agent, or Firm—Bacon & Thomas

[57] ABSTRACT

Method for forming an object (2) of thermosetting synthetic material in a mould (6), having at least one chamber (9), according to which method a mixture of components, which react and cure above a critical temperature, is put in liquid form in the chamber (9) through an inlet piece (1), which is provided with at least one filling duct (3,5) which opens into the chamber (9). The mixture is allowed to react and cure by making sure that the temperature of the mould (6) is higher than said critical temperature. The object (2) with the inlet piece (1) is removed from the mould (6). More particularly, the liquid mixture is inserted in the mould (6) through the inlet piece (1) which sticks through a wall (8) in the mould (6) and which extends outside the mould (6), by means of a casting nozzle (14) which is kept at a temperature which is lower than the critical temperature, whereby the extremity of the casting nozzle fits liquid-tight on the filling opening (4) of the above-mentioned inlet piece (1). At least during the filling of the mould (6), the inlet piece (1) has a lower temperature than the above-mentioned critical temperature, such that the curing first takes place against the inner wall of the mould (6) and finally against the inlet piece (1), and during the curing in the mould (6) a pressure is exerted on the curing synthetic via the cashing nozzle (14).

6 Claims, 2 Drawing Sheets

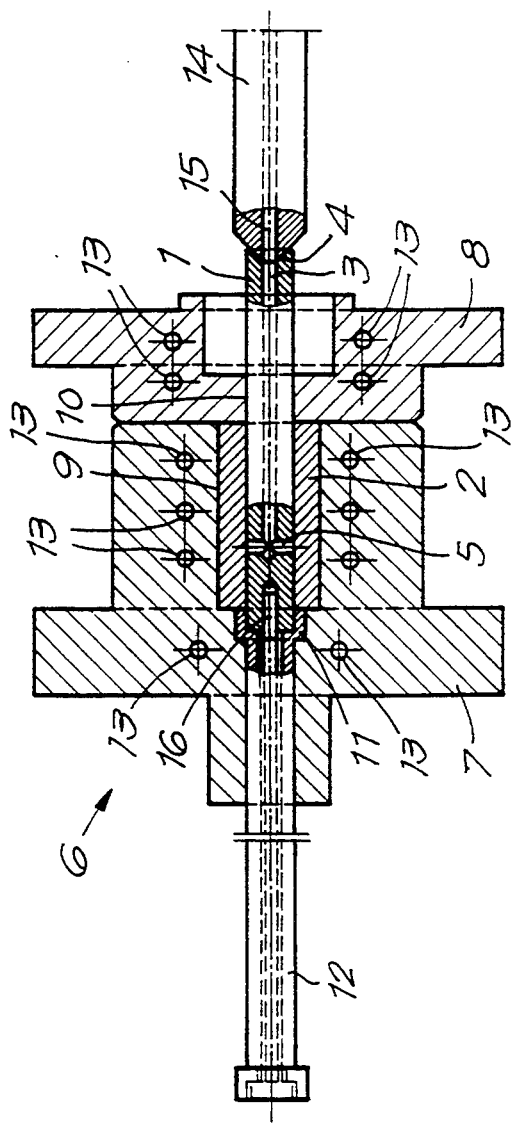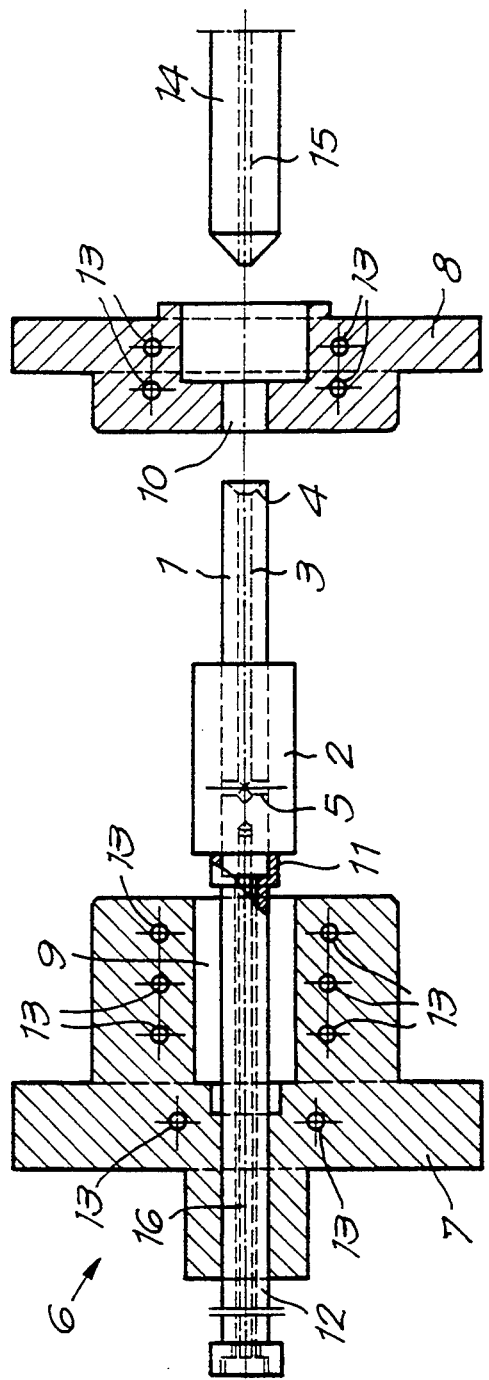

METHOD FOR FORMING AN OBJECT OF THERMOSETTING SYNTHETIC MATERIAL IN A MOULD

BACKGROUND OF THE INVENTION

1. Field of the Invention

The invention concerns a method for forming an object of thermosetting synthetic material in a mould, having at least one chamber, according to which method a mixture of components, which react and cure above a critical temperature, is put in liquid form in the chamber through an inlet piece, which is provided with at least one filling duct which opens into the chamber, whereby said mixture is allowed to react and cure by making sure that the temperature of the mould is higher than said temperature, after which the object with the inlet piece is removed from the mould.

2. Discussion of the Prior Art

Such a method is known from patent EP-A-492 477. The inlet piece is a hollow shaft which is entirely situated inside the mould, and the mould is filled by means of a nozzle which is inserted in a duct which opens into the mould on the hollow shaft. The synthetic and the shape must be specially selected so as to avoid shrinking problems. Moreover, only an example is given with thermoplastic. It is mentioned, however, that also thermosetting synthetic can be used, but how one should proceed in this case is not described. How the above-mentioned nozzle, which must be cooled off to prevent it from being stopped up, can be cooled while it is inserted in a duct in the heated mould is not explained. According to the described method, especially when thermosetting synthetic is used, no great accuracy can be obtained for the objects made.

SUMMARY OF THE INVENTION

The invention aims to remedy the above-mentioned disadvantages and to provide a method for forming an object of thermosetting synthetic in a mould according to which also very precise mechanical parts can be made which require no further processing, for example a roll body with a very precise geometry provided with a shaft or another internal piece, which is preferably functional in the final product.

To this aim the liquid mixture is inserted in the mould through the inlet piece which sticks through a wall in the mould and which extends outside the mould, by means of a casting nozzle which is maintained at a temperature which is lower than the critical temperature, whereby the extremity of the casting nozzle fits liquid-tight on the filling opening of the above-mentioned inlet piece, and one makes sure that, at least during the filling of the mould, the inlet piece has a lower temperature than the above-mentioned critical temperature, such that the curing first takes place against the inner wall of the mould and finally against the inlet piece, and during the curing in the mould a pressure is exerted on the curing synthetic via the casting nozzle.

As the synthetic starts to cure at the mould wall which has a temperature higher than the critical temperature, and the curing subsequently continues towards places situated further away from the wall, it is possible to manufacture an object of synthetic material with great precision by selecting the right position for the filling duct. Shrinkage which may lead to dimensional variation is compensated during the polymerization process and the curing, until the end of the rubber phase, by exerting an after-pressure on the liquid synthetic. The after-pressure is brought about by means of the filling duct, and is preserved until the dimension-sensitive parts have cured. Shrinkage of the synthetic which was last injected may occur in the filling duct. Faults in the synthetic in this inlet piece are of no importance and do not require any final processing.

Practically, an absolute pressure is exerted situated for example between 0.5 and 10 bar.

BRIEF DESCRIPTION OF THE DRAWINGS

In order to better explain the characteristics of the invention, the following preferred embodiments of a method for forming an object of thermosetting synthetic in a mould and of an object made in this manner are described according to the invention by way of example only and without being limitative in any way, with reference to the accompanying drawings, where:

FIG. 2 shows a section of the mould for manufacturing the object from FIG. 1, during the filling;

FIG. 3 shows a section of the mould analogous to that in FIG. 1, but with the mould in open position, as the formed object is being removed.

DETAILED DESCRIPTION OF THE PREFERRED EMBODIMENTS

Figure 1:
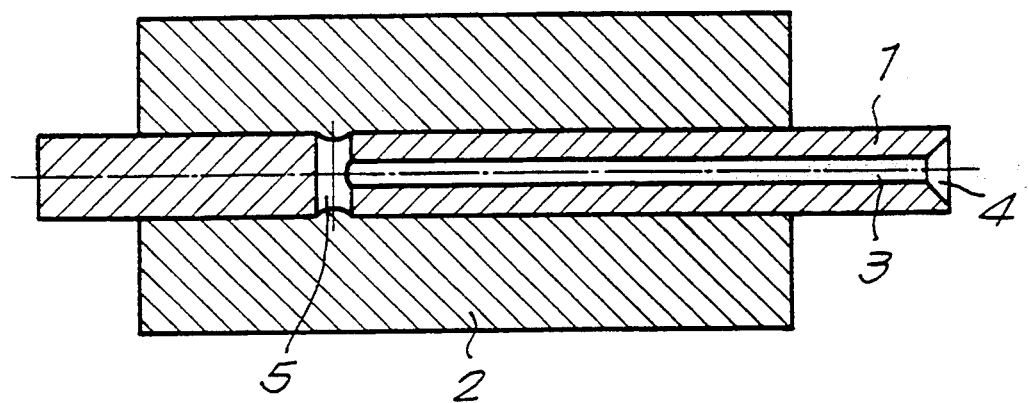
FIG. 1 is a longitudinal section of an object made according to the method of the invention.

The object represented in FIG. 1 consists of an inlet piece which is formed in particular of a steel shaft 1, which is surrounded over part of its length by a part, namely a cylinder 2, of thermosetting synthetic to which the usual additives and fillers such as glass fibres were added.

The shaft is provided with an axial duct 3 which opens into an extremity of the shaft by means of a funnel-shaped filling opening 4 on the one hand, and which is connected to one or several radially directed ducts 5 which open into the cylinder 2 on the other hand.

Suitable thermosetting synthetics are for example polyurethanes resulting from the reaction of one or several isocyanates with a polyol.

The object from FIG. 1 is manufactured by putting a thermosetting mixture made up of components which react and cure above a critical temperature and possibly also additives and/or fillers in a closed, heated mould 6.

As represented in the FIGS. 2 and 3, mould 6 comprises of a tub-shaped body 7 and a removable lid 8 which closes off body 7 in its closed position inside the mould 6 is thus created a central round chamber 9 which corresponds to a part of the object to be formed, namely the cylinder of synthetic material 2 and the part of the steel shaft 1 which is situated in the cylinder 2 and protrudes outside cylinder 2 at the extremity which is turned away from the filling opening 4.

The wall of the mould 6 and in particular the lid 8 is provided with a central opening 10 through which the extremity of the shaft 1 which protrudes outside the cylinder 2, the side with the funnel-shaped filling opening, sticks. An axially directed duct 11 extends through the bottom of the body 7 in which an ejector bar 12 is mounted in a slidable manner. Ejector bar 12 ends in tub-shaped part 11 in which an extremity of the shaft 1 fits. In the non-extended position of the ejector bar 12, tub-shaped part 11 forms a part of the wall of the above-mentioned chamber 9.

Ducts 13 for heating or cooling liquid extend both through the body 7 and through the lid 8, as a result of which the temperature of the mould 6 can be adjusted.

Before the mixture of synthetic components is inserted, the metal shaft 1 is placed in the mould 6 such that, after the lid 8 has been applied, when the mould is closed, the extremity with the filling opening 4 is situated outside the mould. Naturally, the ejector bar 12 is hereby maximally slid back, as represented in FIG. 2. Its tub-shaped extremity 11 receives the other extremity of the shaft 1. Moreover, the shaft 1 is fixed to the ejector bar 12 by means of a pin 16 which is placed axially in the tub-shaped extremity and which is screwed in an extremity 11 of the shaft 1.

By means of liquid which is pumped through the ducts 13 or by means of any other heating systems, the mould 6 is maintained at a temperature which is higher than the critical temperature at which the synthetic components start to react and thus at which the curing starts. For an isocyanate moulding resin, for example, the temperature of the mould 6 amounts to 130 degrees Celsius.

The shaft 1 itself is not or only slightly heated, such that it has a temperature which is significantly lower than the above-mentioned critical temperature.

The synthetic components are inserted in the closed mould 6 via the duct 3 and the radial ducts 5 in the shaft 1, by means of a cooled casting nozzle 14 which is provided with a duct 15. Casting nozzle 14 has an extremity which has the complementary shape of the filling opening 4, such that casting nozzle 14 fits perfectly on this filling opening, as represented in FIG. 2.

The casting nozzle 14 is connected to a mixer, which is not represented in the FIGS. 2 and 3 for the sake of clarity, in which the components of the thermosetting synthetic are mixed, possibly together with the usual additives such as for example a catalyst, and the usual fillers, such as for example glass fibres. The casting nozzle 14 may be cooled off for example by blowing air over the nozzle or by pumping cooling liquid around the casting nozzle. In any case, the casting nozzle 14 has a temperature which is significantly lower than the above-mentioned critical temperature, such that the reaction between the components cannot take place in the duct 15, and the casting nozzle 14 does not become stopped up by curing synthetic. This casting nozzle 14 only makes contact with the shaft 1 which, as already mentioned, also has a temperature which is lower than the above-mentioned critical temperature.

The components are inserted at an absolute pressure between 0.5 and 10 bar, which pressure is maintained as long as the casting nozzle 14 is connected to the shaft 1, which is both during the filling of the mould 1 and during the curing of the injected synthetic around the shaft 1. The filling may take about one to two minutes, the curing some ten to twenty minutes, depending among others on the amount of resin, the type of catalyst, the fillers, the geometry of the object, the temperature, etc.

The mixture of components which is inserted is at room temperature or is slightly heated, but in any case at a temperature which is significantly lower than the above-mentioned critical temperature. Once inserted, the warm mould wall makes the temperature of the mixture rise and, when the temperature of the mixture against the wall of the mould has reached the critical temperature, the reaction of the components starts, whereby the polymerization of the thermosetting synthetic goes first through a gel and a rubber-like phase to finally become a complete, three-dimensional network of cured resin.

The warmth spreads from the heated wall, and thus the reaction is continued towards the center. As soon as the reaction has reached the shaft 1 and the components in the ducts 5 or 3 begin to cure, the filling is stopped and the casting nozzle 14 is removed from the shaft 1. The last inserted amount of mixture can now cure and after-shrink freely and pressureless in the duct 3 in the shaft 1. Residual shrinkage which appears around the filling holes of the ducts 5 can be absorbed by the content of duct 3, and has no further influence on the accuracy of the cylinder 2 and thus of the entire object which is manufactured. Finally, the lid 8 is removed and, by means of the ejector bar 12, the formed object is pushed out of the body 7.

The pressure during the insertion and curing of the composite is not high. Working at a low pressure is favourable when manufacturing precision products, as there is no deformation of the mould, and, moreover, the thermosetting synthetic remains perfectly pressed against the wall in the rubber phase, which immediately precedes the definite curing, whereby the shrinking effect is compensated. The thus obtained high accuracy is about 0.02 mm, and no further processing of the synthetic is required.

Figure 4:
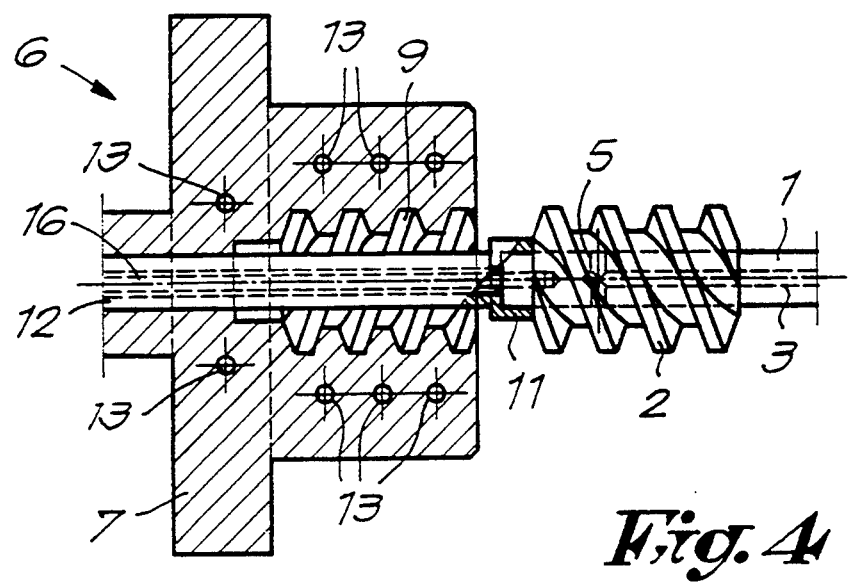
FIG. 4 shows a part of a section analogous to that in FIG. 3, but with relation to another embodiment of the object and method according to the invention.

Also other shapes than a cylinder 2 can be made in the above-described manner around a metal shaft 1. Thus, the synthetic part may be a screw as represented in FIG. 4. After the curing this cured synthetic part 2 is screwed out of the body 7 by means of the ejector bar 12 which is rotated with the help of means which are not represented in the figures during the pushing out. Ejector bar 12 moves the shaft 1 with the screw 2, by means of the pin 16 which is situated in the middle of the tub-shaped extremity 11 of the bar 12 and which is screwed in an opening at the extremity of the shaft 1 during the insertion of the shaft 1 in the open mould 6.

The above-described method makes it possible to manufacture products consisting of a shaft surrounded by a synthetic part with much precision and without any final processing being required. The cured synthetic part 2 sticks very well to the metal shaft 1.

The present invention is by no means limited to the embodiments described above and represented in the figures; on the contrary, such a method for forming an object of thermosetting synthetic in a mould and the thus manufactured object can be made according to various variants while still remaining within the scope of the invention.

In particular, the critical temperature should not necessarily be 130 degrees Celsius. This temperature depends on the composition of the mixture used and thus among others of the reacting components, the catalyst, the fillers, etc.

Also the shape of the synthetic part must not necessarily be a cylinder or a screw. Other shapes are possible, even shapes which are not round. Neither should the shaft be necessarily situated centrally in this synthetic part. Nor should the shaft necessarily protrude on two sides of the synthetic. Nor should it necessarily be made of metal. It may for example be made of the same synthetic as the synthetic which is inserted in the mould.

The inlet piece should not even necessarily be a shaft. It may have another shape.

We claim:

1. A method of forming an object of thermosetting synthetic material within a chamber of a mold comprising:

provided an inlet piece with at least one filling duct having an associated filling opening;

inserting said inlet piece through an end wall of the mold and into said chamber at a location radially spaced from an inner wall of said chamber while maintaining a portion of said inlet piece, that incorporates the filling opening, outside of the mold;

filling the chamber, through a casting nozzle that fits in a liquid tight manner to the filling opening of said inlet piece, with a mixture of components in liquid form, said mixture of components being adapted to react for curing above a predetermined critical temperature;

maintaining the temperature of the mold higher than said predetermined critical temperature such that said mixture of components react and cure while maintaining, at least during filling of the chamber, said inlet piece at a temperature that is lower than said predetermined critical temperature such that curing of said mixture of components first takes place against the inner wall of said chamber and then against said inlet piece;

exerting a pressure on said mixture of components, via said casting nozzle, during curing of said mixture of components within the mold; and removing the object, along with said inlet piece, from said mold.

2. The method according to claim 1, wherein the pressure exerted on said mixture of components ranges between 0.5 and 10 bars.

3. The method according to claim 1, further comprising:

situating said inlet piece centrally in said chamber.

4. The method according to claim 1, further comprising:

forming said inlet piece with at least first and second filling ducts with said first filling duct extending through said inlet piece along a longitudinal axis of symmetry associated with the inlet piece and said second filling duct projecting radially from said first filling duct.

5. The method according to claim 1, further comprising:

forming said inlet piece as a shaft.

6. The method according to claim 1, further comprising:

stopping the filling of said chamber with the mixture of components in liquid form when the curing has reached said inlet piece.

* * * * *